(12) United States Patent
Lunt et al.

(10) Patent No.: US 6,970,259 B1
(45) Date of Patent: Nov. 29, 2005

(54) SYSTEMS AND METHODS FOR FORGERY DETECTION AND DETERRENCE OF PRINTED DOCUMENTS

(75) Inventors: Teresa F. Lunt, Palo Alto, CA (US); Matthew K. Franklin, Davis, CA (US); David L. Hecht, Palo Alto, CA (US); Thomas A. Berson, Palo Alto, CA (US); Mark J. Stefik, Portula Valley, CA (US); R. Drew Dean, Cupertino, CA (US); Alan G. Bell, Palo Alto, CA (US); Thomas M. Breuel, Brisbane, CA (US); Todd A. Cass, San Francisco, CA (US); Douglas N. Curry, Palo Alto, CA (US); Daniel H. Greene, Sunnyvale, CA (US); Robert T. Krivacic, San Jose, CA (US)

(73) Assignee: Xerox Corporation, Stamford, CT (US)

( * ) Notice: Subject to any disclaimer, the term of this patent is extended or adjusted under 35 U.S.C. 154(b) by 928 days.

(21) Appl. No.: 09/722,362

(22) Filed: Nov. 28, 2000

(51) Int. Cl.[7] .............................................. G06K 1/00
(52) U.S. Cl. ................... 358/1.14; 358/3.28; 358/1.15; 382/100; 382/135; 713/176; 713/186
(58) Field of Search ............................. 358/1.14, 1.15, 358/3.28; 709/229; 710/8; 283/72, 85, 92, 283/902, 901, 86; 380/51, 54; 382/100, 232, 382/135; 713/176, 186, 201; 235/468; 347/43; 399/366

(56) References Cited

U.S. PATENT DOCUMENTS

| | | | | |
|---|---|---|---|---|
| 5,157,726 A | | 10/1992 | Merkle et al. | |
| 5,444,779 A | * | 8/1995 | Daniele ...................... | 399/366 |
| 6,138,913 A | * | 10/2000 | Cyr et al. .................... | 235/468 |
| 6,233,684 B1 | * | 5/2001 | Stefik et al. ................. | 713/176 |
| 6,234,537 B1 | * | 5/2001 | Gutmann et al. ............. | 283/86 |
| 6,239,818 B1 | * | 5/2001 | Yoda ........................... | 347/43 |
| 6,621,590 B1 | * | 9/2003 | Livingston ................. | 358/1.15 |
| 6,636,615 B1 | * | 10/2003 | Rhoads et al. .............. | 382/100 |
| 6,721,438 B1 | * | 4/2004 | Iwamura et al. ............ | 382/100 |
| 6,728,390 B2 | * | 4/2004 | Rhoads et al. .............. | 382/100 |
| 6,731,776 B1 | * | 5/2004 | Fujiwara ..................... | 382/100 |
| 6,744,906 B2 | * | 6/2004 | Rhoads et al. .............. | 382/100 |
| 2002/0018233 A1 | * | 2/2002 | Mori ......................... | 358/1.15 |
| 2003/0182475 A1 | * | 9/2003 | Gimenez ....................... | 710/8 |
| 2003/0204753 A1 | * | 10/2003 | Raley et al. ................. | 713/201 |
| 2004/0103202 A1 | * | 5/2004 | Hildebrand et al. ........ | 709/229 |
| 2004/0125402 A1 | * | 7/2004 | Kanai et al. ............... | 358/1.15 |
| 2005/0078332 A1 | * | 4/2005 | Brown ....................... | 358/1.14 |

* cited by examiner

Primary Examiner—Kimberly Williams
Assistant Examiner—Satwant Singh
(74) Attorney, Agent, or Firm—Oliff & Berridge, PLC

(57) ABSTRACT

A print management system includes a policy that determines a protection level for a document to be printed. The document is printed using forgery detection and deterrence technologies, such as fragile and robust watermarks, glyphs, and digital signatures, that are appropriate to the level of protection determined by the policy. A plurality of printers are managed by a print management system. Each printer can provide a range of protection technologies. The policy determines the protection technologies for the document to be printed. The print management system routes the print job to a printer that can apply the appropriate protections and sets the appropriate parameters in the printer. Copy evidence that can establish that a document is a forgery and/or tracing information that identifies the custodian of the document and restrictions on copying of the document and use of the information in the document are included in the watermark that is printed on the document. A document can be verified as an original or established as a forgery by inspecting the copy evidence and/or tracing information in the watermark.

26 Claims, 11 Drawing Sheets

LEVEL 2 PROTECTION

LEVEL 4 PROTECTION

LEVEL 5 PROTECTION

SYSTEMS AND METHODS FOR FORGERY DETECTION AND DETERRENCE OF PRINTED DOCUMENTS

BACKGROUND OF THE INVENTION

1. Field of Invention

This invention relates to document forgery protection systems and methods.

2. Description of Related Art

Various techniques are known for detecting and/or deterring forgery of an original printed document. Document forgery includes both unauthorized alteration of the original document and unauthorized copying of the original document. Previously, watermarks have been applied to documents to detect and/or deter forgery. Watermarks are printed marks on a document that can be visually detected or detected using special equipment. Fragile watermarks are marks that appear in an original printed document but that will not appear in a copy of the original document made on a standard photocopier or will be detectably degraded in the resulting copy of the document.

Robust watermarks are marks in an original document that will be accurately reproduced on any copy of the original document made on an standard photocopier so that information contained in the watermark can be extracted from the copy. There are two types of robust watermarks that can be used. The first type of robust watermark is a mark that appears on both the original document and a copy. The second type of robust watermark is a mark that is present, but that is not readily visible, on the original document, but that becomes clearly visible on a copy of the original document. The second type of robust watermark is also known as an invisible robust watermark.

Forgery of an original document containing a fragile watermark by copying the original document is easily detected by the absence of the watermark on the copy of the original document. Forgery of an original document containing the first type of robust watermark is detected by extracting information contained in the robust mark. This information could identify a custodian of the original document and information relating to copy restrictions or other restrictions as to the use of the information in the original document. Forgery of an original document containing the second type of robust watermark is detected by the visible presence of the watermark on the copy of the original document. For example, the information contained in the second type of robust watermark could be a banner that reads "This is a copy" or a similar warning.

SUMMARY OF THE INVENTION

This invention provides systems and methods for adding fragile and robust watermarks to an original document as it is printed.

This invention separately provides systems and methods for printing a document requiring forgery protection using a number of trusted printers.

This invention separately provides a series of trusted printers that together permit differing levels of forgery protection to be provided to a document to be printed.

In accordance with various exemplary embodiments of the systems and methods according to this invention, a family of trusted printers is managed to provide a range of different forgery detection and deterrence techniques. The protection requirements for an original document to be printed are determined by a trusted printing policy. The factors used to determine the protection requirements required for the original document to be printed include the value of the document being created, assumptions about the resources available to an adversary or attacker, such as a potential forger, and the cost of providing the protections to the original document to be printed.

When an original document requiring forgery protection is to be printed, the print job for that document is routed to a trusted printer that can print a watermark that includes copy evidence and/or tracing information necessary to obtain the required level of protection. Copy evidence is evidence that can be obtained through an inspection of a document that indicates whether that particular document is an unauthorized copy of an original document. Tracing information is information printed on a document that identifies the custodian(s) of the original document and restrictions on further copying that apply to the custodian(s) and to the original document. Other information may also be included in the tracing information that serves to more uniquely identify the original. The required copy evidence is applied to the printed document through the use of fragile watermarks or robust watermarks.

The required tracing information is applied to the printed document through the use of robust watermarks. The parameters of the selected trusted printer are set by a print management system to print the watermark(s), including the copy evidence and/or tracing information, appropriate to the required level of protection.

These and other features of the invention will be described in or are apparent from the following detailed description of various exemplary embodiments of systems and methods according to this invention.

BRIEF DESCRIPTION OF THE DRAWINGS

Various exemplary embodiments of systems and methods according to this invention will be described with reference to the following drawings, wherein.

DETAILED DESCRIPTION OF PREFERRED EMBODIMENTS

Figure 1:
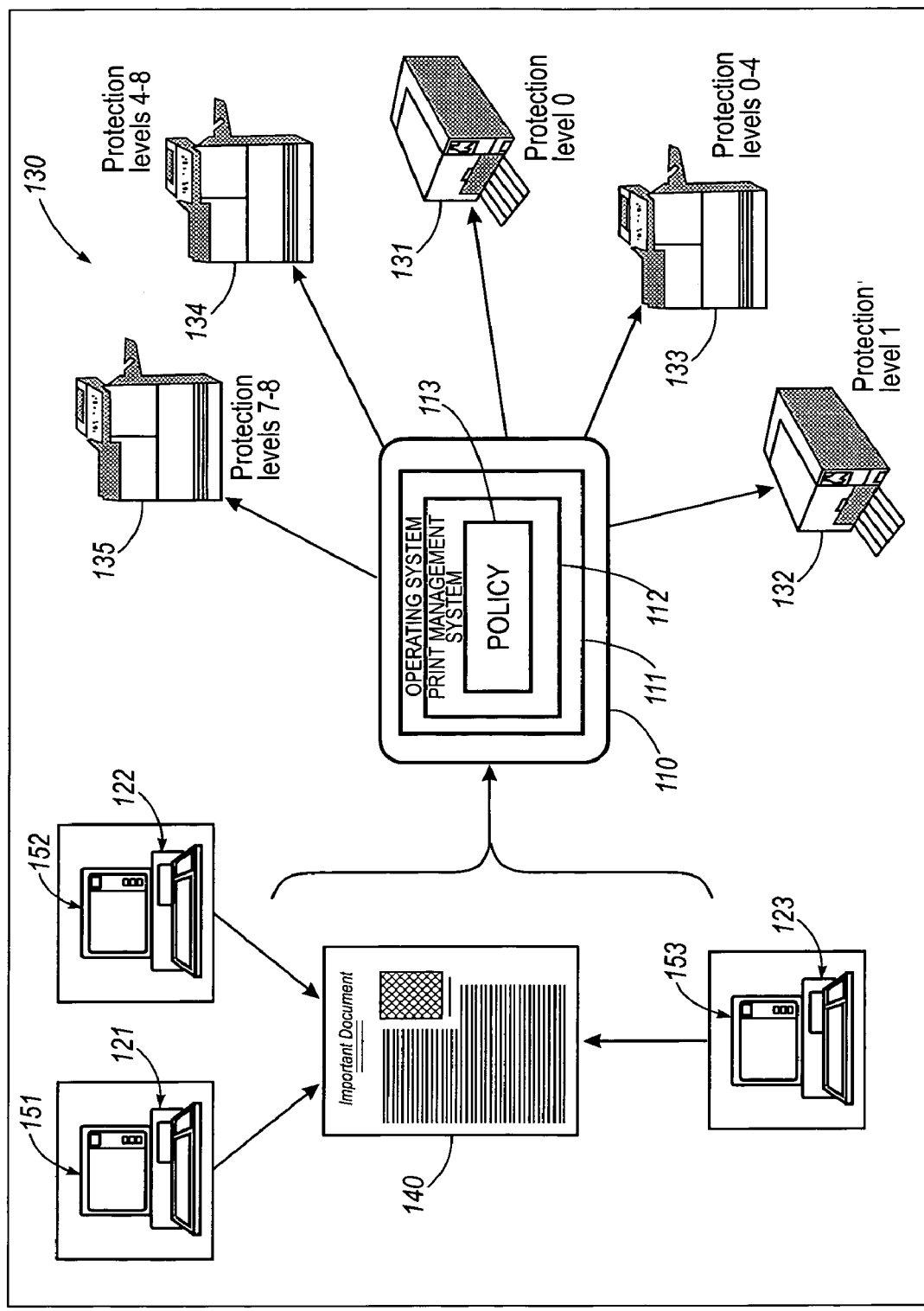
FIG. 1 is a schematic diagram illustrating a print management system according to this invention.

FIG. 1 is a schematic diagram illustrating a system for policy based printing. A network 100 includes at least one server 110 that controls a plurality of computers 121, 122 and 23. The server 110 also controls a family 130 of trusted printers 131–135. A trusted printer is a printer that is available only to authorized users of the network 100. The server 110 includes an operating system 111 that allows users of the network 100 to use various applications stored in the server 110 on the computers 121, 122 and 123. The applications may include, for example, word processing applications, spreadsheet applications, image scanning and/or processing applications, and/or database management applications. Authorized users of the computers 121, 122 and 23 can use the applications stored in the server 110 and controlled by the operating system 111 to create documents 140. The applications process images of the document 140 that can be viewed on the display units 151, 152 and 153 of the respective computers 121, 122 and 123.

The document 140 can be printed by entering a print command into one of the computers 121 or 122 or 123 and sending a print job to the server 110. The operating system 111 includes a print management system 112 that selects one of the family 130 of the trusted printers 131–135 that can provide a required level of protection for the document 140 to be printed. The print management system 112 includes a policy 113 that maps the document protection requirements to the specific security protection techniques available from the family 130 of the trusted printers 131–135.

The policy 113 determines the required protection level for the document 140 to be printed by collecting information about the value of the document 140 from the document creator or owner or from any other person authorized to print the document 140. The information may include assumptions about potential forgery and the cost necessary to provide a level of protection to detect and/or deter the potential forgery. The user may enter the information about the document 140 through a graphical user interface provided on one of the display units 151–153 of the particular computers 121–123 being used to print the document 140.

The print management system 112 may also allow the users to question each of the trusted printers 131–135 to determine what protection level each trusted printer 131–135 provides. The print management system 112 may also provide information to the user about which forgery techniques each protection level is able to detect and/or deter and the costs of using each protection level. Each computer 121–123 may be controlled by the print management system 112 and/or the operating system 111 to display to users the protection levels that may be applied to the document 140 to be printed.

Each document 140 to be printed may also have a security level embedded in it, attached to it or otherwise associated with it, that the print management system 112 can use to identify the specific combination of protection techniques needed to detect and/or deter potential forgery. The policy 113 is programmable and may be adapted to the particular requirements of the organization that operates, owns or uses the network 100. The policy 113 may be programmed to assign a protection level or levels for every authorized user of the network 100 or for every computer 121–123 of the network 100.

Every user of the network 100 may have an identification that is programmed into the policy 113. The identification may be a login password or user identification. Every document 140 printed by the user identified by the identification may have be assigned a specified protection level, a minimum protection level and/or a maximum protection level.

Every computer 121–123 of the network 100 may have an identification value. The computer identification values may be programmed into the policy 113. Every print job sent by the identified one of the computers 121–123 to the server 110 may have a specified protection level, a minimum protection level and/or a maximum protection level. The policy 113 determines the protection requirements for the document 140 to be printed by identifying the user that enters the print command and/or the computer 121–123 that sends the print job.

The policy 113 may also conduct a search of the content of the document 140 to determine the required protection level. The search could be, for example, a keyword search or a keyphrase search of the document 140. The protection requirements of the document 140 could be dependent on the number of occurrences of various ones of the keywords or keyphrases.

The policy 113 determines the security requirements for the document 140 to be printed. For example, the policy 113 may determine that the document 140 to be printed requires protection against forgery by copying using a standard photocopier. Alternatively, the policy 113 may determine that the document 140 to be printed requires protection against scanning, image processing, and alteration of the contents of the document 140. Once the policy 113 determines the security requirements, the print management system 112 identifies the specific combination of protection techniques needed to meet these requirements. The print management system 112 then routes the print job to one of the trusted printers 131–135 that can apply the appropriate protections and sets the parameters in the selected printer to apply the appropriate protection techniques to the document 140. Examples of the protection levels that can be applied to the document 140 when it is printed, the forgery techniques that the protection levels protect against and the equipment necessary for creating the protection level and verifying the authenticity of a document are described in Table 1.

TABLE 1

| Protection Levels | Technique(s) | Protects Against | Equipment Needed |
|---|---|---|---|
| Level 0 | Fragile variable copy evident watermark. | Adversary with standard copier and toner or ink. Blank originals attack. | Standard color printer, or special toner or ink, or hyperacuity printer with inspector. |
| Level 1 | Robust variable invisible copy evident watermark with tracing information. | Adversary who can remove copy evident watermarks from originals. Blank originals attack. Compromised tracing attack. | Standard color printer with special toner or ink. |

TABLE 1-continued

| Protection Levels | Technique(s) | Protects Against | Equipment Needed |
|---|---|---|---|
| Level 2 | Fragile variable fluorescing invisible copy evident watermark to print page offset, with tracing information. | Weak protection against tampering. Blank originals attack. | Special toner or ink and standard highlight or color printer. Enhancements could include toner sensor or sensors to verify the presence of the copy-evident watermark. Fluorescent light to verify. |
| Level 3 | Fragile variable fluorescing invisible copy evident watermark to print page offset, with tracing information, digitally signed and glyph encoded. | Adversary who can scan, image process, and print and who has access to the special toner or ink. | Special toner or ink and standard highlight or color printer. Enhancements could include toner sensor or sensor to verify the presence of the copy evident watermark. Fluorescent light and fluorescent scanner to verify. |
| Level 4 | Fragile variable fluorescing invisible copy evident watermark to print random portions of the page, with tracing information, digitally signed and glyph encoded. | Adversary who can scan, image process, and print and who has the special toner or ink. | Special toner or ink and standard highlight or color printer. Enhancements could include toner sensor or sensors to verify the presence of the copy evident watermark. Fluorescent light and fluorescent scanner to verify. |
| Level 5 | Robust variable fluorescing black copy evident watermark with tracing information. | Adversary with standard standard copier and toner or ink. Compromised tracing attack. | Fluorescing black toner or ink in a standard highlight or color printer. Fluorescent light to verify. |
| Level 6 | Robust variable fluorescing black copy evident watermark with tracing information to print fixed portions of the page. | Adversary with standard copier and tone or ink. Detached toner attack. Blank originals attack. | Fluorescing black toner or ink in a standard highlight or color printer. Fluorescent light to verify. |
| Level 7 | Robust variable fluorescing black copy evident watermark to print random portions of the page, with the random pattern specification encrypted and glyph encoded | Adversary with standard copier and toner or ink. Adversary with a scanner and image processor. Detached toner attack. Compromised tracing attack. | Fluorescing black toner or ink in a standard highlight or color printer. Fluorescent light to verify. Inspector to read and verify the glyph. |
| Level 8 | Robust variable fluorescing black copy evident watermark to print content dependent portions of the page, with tracing information, encrpyted and glyph encoded | Adversary who alters tracing information. Adversary with standard copier and ink. Adversary who can scan and image process. Detached toner or ink attack. Compromised tracing attack. | Fluorescing black toner in a standard highlight or color printer. Fluorescent light to verify. Inspector to read and verify the glyph. |

Although Table 1 shows various watermarking techniques usable either alone or in combination to provide a specified level of protection to a document, it should be appreciated that the table is merely one exemplary embodiment of a policy 1113. Other combinations of watermarking techniques may be provided to enable a greater range of protection levels.

As shown in FIG. 1, the trusted printer 131 can print documents having Level 0 protection, the trusted printer 132 can print documents requiring Level 1 protection, the trusted printer 133 can print documents requiring Level 0 through Level 4 protection, the trusted printer 134 can print documents requiring Level 4 through Level 8 protection and the trusted printer 135 can print documents requiring Level 7 and Level 8 protection.

Figure 2:
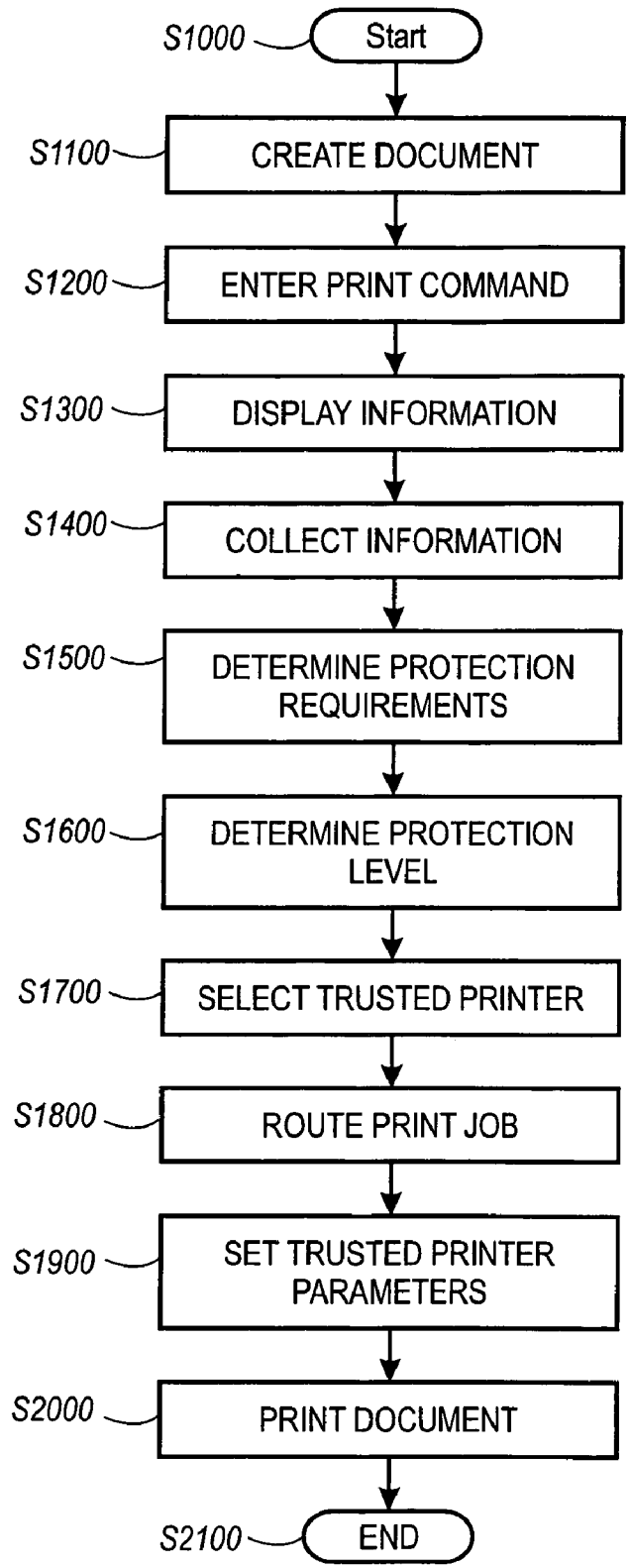
FIG. 2 is a flowchart of a document forgery protection printing method according to an exemplary embodiment of this invention.

FIG. 2 is a flowchart of one exemplary embodiment of a document forgery protection printing method according to this invention. Beginning in step S1000, control continues to step S1100, where a user creates a document that requires forgery protection. Then, in step S1200, the user enters a print command to print the document requiring forgery protection. Next, in Step S1300, information about the protection levels is displayed to the user. Control then continues to step S1400.

In Step S1400, information is collected about the value of the document requiring forgery protection. The information may include information or assumptions about potential forgery of the document requiring forgery protection and the cost of applying the various available protection techniques to the document requiring forgery protection. Next, in step S1500, the protection requirements of the document requiring forgery protection are determined based on a trusted printing policy. The determined protection requirements for the document requiring forgery protection may indicate that this document requires protection against forgery from copying using a standard photocopier or that the document requiring forgery protection requires protection against forgery by scanning, image processing and altering of the contents of the document. Then, in step S1600, the protection level that provides the specific combination of protection techniques to meet the determined protection requirements is determined. Control then continues to step S1700.

In step S1700, a trusted printer that can apply the appropriate protection techniques to the document requiring forgery protection is selected based on the determined protection level. Then, in step S1800, the print job for the document requiring forgery protection is routed to the selected trusted printer. Next, in step S1900, the parameters in the selected trusted printer are set based on the determined protection level. In step S2000, the document requiring forgery protection, including the protection techniques of the determined protection level, is printed using the selected trusted printer. Then in step S2100 the method ends.

Although one exemplary embodiment of a document forgery protection printing method according to this invention has been described above with respect to FIG. 2, it should be appreciated that other exemplary embodiments of document forgery protection printing methods may be apparent to those of ordinary skill in the art. For example, in various exemplary embodiments of the document forgery protection printing method according to this invention, the information about the protection levels may be displayed prior to the print command being entered. In other various exemplary embodiments of the document forgery protection printing method invention of this invention, the information about the value of the document and the potential forgery of the document may also be collected prior to the print command being entered. In other various exemplary embodiments of the document forgery protection printing method according of this invention, the parameters of the selected trusted printer may be set prior to the print job being routed to the selected trusted printer.

Figure 3:
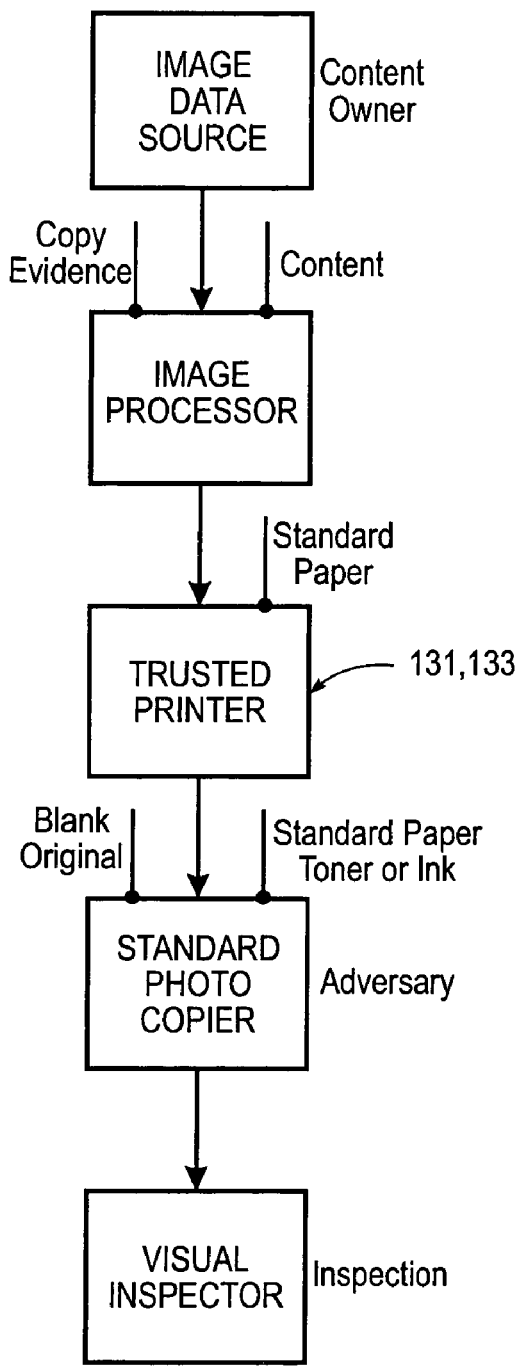
FIG. 3 is a flow diagram of a document forgery protection printing and detection system according to an exemplary embodiment of this invention.

As shown in FIG. 1, the trusted printers 131 and 133 can print documents having Level 0 protection. As shown in Table 1, Level 0 protection includes a fragile variable copy evident watermark. As shown in FIG. 3, the content owner, who may be anyone authorized to create the document 140, view the document 140, and/or print the document 140, provides image data from an image data source, which may be one of the computers 121–123 or an external data storage device, to an image processor, which may be an application stored on the server 110, to create the document 140.

Copy evidence is also provided to the image processor and included with the contents of the document 140. The copy evidence included in the document 140 can vary with the page of the document 140 and could include information identifying the contents of the page, the page number or identifier, the author, the document title, the date, the time, and the originating organization. The copy evidence could also include characteristics about the trusted printer 131 or 133 or a unique copy number recorded by the trusted printer 131 or 131. The copy evidence may be provided by the content owner through a graphical user interface provided on one of the display units 151–153 of one of the respective computers 121–123, or may be determined automatically by the operating system 111, the print management system 112, and/or the policy 113. The copy evidence is encoded in a fragile variable copy evident watermark. Because the copy evidence varies with each page of the document, the fragile variable copy evident watermark varies with each page.

The fragile variable copy evident watermark of Level 0 may be formed by any known technique for forming fragile watermarks. Techniques for forming fragile watermarks include, for example, microvariations in ink density within the letters, extremely small glyphs contained in the letters, very small marks or textures, possibly in color, that are printed on the background or one or more unused portions of the sheet of recording material that the document is printed on that are made to appear as shading or fibers in the sheet of recording material, hyperacuity pixels within characters of text, and serpentones within color or black and white images.

If the policy 113 determines that the security requirements for the document 140 to be printed require a fragile variable copy evident watermark, the print management system 112 routes the print job to either trusted printer 131 or 133. The print management system 112 also sets the parameters in the trusted printer 131 or 133 to print the fragile variable copy evident watermark.

The fragile variable copy evident watermark may be made more difficult to forge by encoding the copy evidence in the fragile variable copy evident watermark so that the information can only be decoded by a secret key contained in the trusted printer 131 or 133 or belonging to the content owner. The copy evidence contained in the fragile variable copy evident watermark may also depend on unique physical characteristics of the trusted printer 131 or 133. For example, a random pattern may be applied to the document by the trusted printer 131 or 133 as disclosed in U.S. application Ser. No. 09/504,036, incorporated herein by reference in its entirety. Copy evidence unknown to an adversary, such as a forger, could also be encoded in the fragile variable copy evident watermark or the fragile variable copy evident watermark could be printed using methods that are difficult or very expensive to reproduce such as, for example, spectral modulation.

As shown in Table 1, the trusted printer 131 or 133 may be a standard color printer or a standard printer provided with special toner or ink, such as, for example, fluorescing or magnetic toner or ink. The trusted printer 131 or 133 may also be a hyperacuity printer that can print serpentones. An inspector device may be used to verify the presence of the serpentones, or the presence of the special toner or ink. The inspector device can also read the contents of the fragile variable copy watermark. Such printers and inspector devices are disclosed in U.S. Pat. Nos. 5,706,099 and 5,710,636, each incorporated herein by reference in its entirety.

As shown in FIG. 3, the trusted printer 131 or 133 prints the document 140 on standard paper. Standard paper is paper that does not necessarily have a preprinted watermark. As shown in FIG. 3, a document 140 printed with the fragile variable copy evident watermark of Level 0 is protected against an adversary having access to the original printed document and a standard photocopier with standard toner or ink. A visual inspector can verify if a document is an original or a forgery. The visual inspector may be any person authorized to inspect documents for authenticity. A document is verified as an original by the undistorted appearance of the fragile variable copy evident mark. A document is established as a forgery by the absence, or the discolored appearance, of the fragile variable copy evident mark. Depending on the technology used to generate the copy evident watermark, the inspector device may be required to verify the presence of, and read the contents of, the copy evident watermark.

As shown in FIG. 3, because the copy evidence in the fragile copy evident watermark of Level 0 varies with the page printed, Level 0 also protects against a blank originals attack. A blank originals attack is attempted forgery by copying of the original document on blank originals. Blank originals are sheets of recording material containing a preprinted fragile watermark However, the preprinted fragile watermark of the blank originals does not vary with the page printed. Thus, the presence of the non-varying preprinted fragile watermark can be detected by the visual inspector. Detecting of a non-varying fragile watermark establishes a document as a forgery.

As shown in FIG. 1, trusted printers 132 or 133 can print documents having Level 1 protection. As shown in Table 1, Level 1 protection includes a robust invisible variable copy evident watermark with tracing information. The robust invisible variable copy evident watermark may be formed by any known or later developed technique for forming robust watermarks. Techniques for forming robust watermarks include, for example, slight vertical translations of letters with respect to a baseline, slight variations of spacing between letters, line indents, margins, and/or line spacings. The robust watermarks may also be formed by adding luminance or gray-scale noise-like patterns.

The robust invisible variable copy evident watermark of Level 1 can be used to encode the copy evidence and the tracing information. The copy evidence included in the document 140 can vary with the page of the document 140 and could include information identifying the content of the page, the page number or identifier, the author, the document title, the date, the time, and the originating organization. The copy evidence could also include characteristics about the trusted printer 132 or 133 or a unique copy number recorded by the trusted printer 132 or 133. The copy evidence can also include a large banner that prominently displays a warning statement, such as, for example, "This is a copy" or some similar warning. The tracing information may include, for example, information identifying to whom the original document was given, who is authorized to possess the document, and information relating to copy restrictions or other restrictions as to the use of the information in the document. The tracing information can be specified in a Digital Property Rights Language. The copy evidence and tracing information are encoded in the robust invisible variable copy evident watermark.

Figure 4:
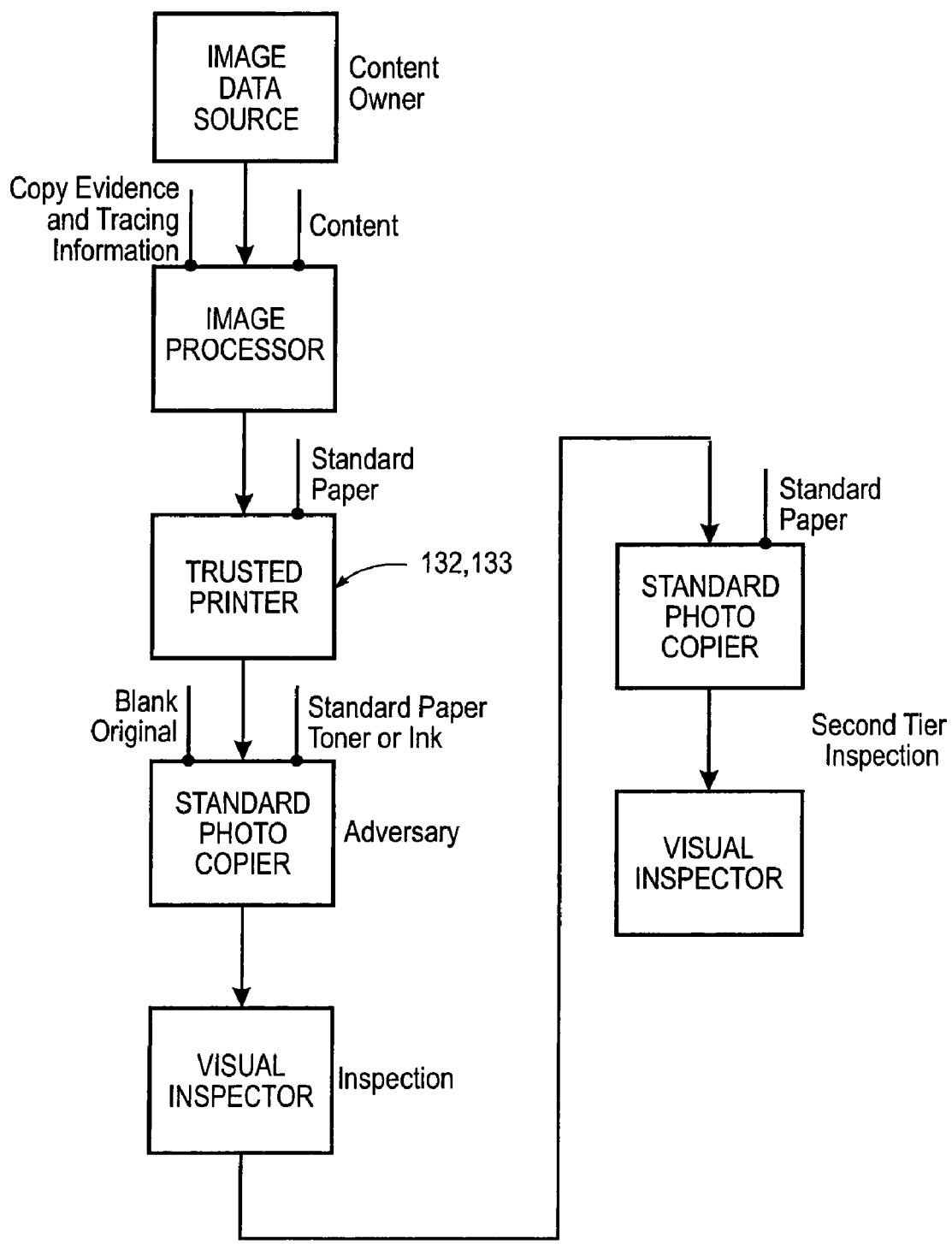
FIG. 4 is a flow diagram of a document forgery protection printing and detection system according to an exemplary embodiment of this invention.

As shown in FIG. 4, the content owner provides image data from an image data source, which may be one of the computers 121–123 or an external data storage device, to an image processor, which may be an application stored on the server 110, to create the document 140. Copy evidence and tracing information is also provided to the image processor and included with the contents of the document 140. During image processing of the document 140, the copy evidence and the tracing information are included in the contents of the document 140. The copy evidence and the tracing information included in the document 140 may be entered by the content owner through a graphical user interface provided on one of the display units 151–153 of one of the respective computers 121–123, or may be determined automatically by the operating system 111, the print management system 112, and/or the policy 113.

The print management system 112 routes the print job to the trusted printer 132 or 133 and the document is printed on standard paper. As shown in FIG. 4, Level 1 provides protection against an adversary who has access to the original document 140 and a standard photocopier and standard paper and toner or ink. If the adversary copies the original document 140 on the standard photocopier using standard toner or ink and standard paper, a visual inspector can establish the resulting copy as a forgery by noting the clearly visible appearance of the robust variable copy evident watermark on the resulting copy. If a document appears to lack the robust variable copy evident watermark, this is evidence that the document may be an original, but a second tier inspection is required.

As shown in FIG. 4, the second tier inspection can determine if a document is an original. The document is copied on a standard copier using standard paper. If the resulting copy contains a clearly visible watermark, the original document can be verified as an original.

As shown in Table 1, Level 1 provides protection against an adversary that can remove the robust variable copy evident watermark by, for example, scanning the document and removing or deleting the watermark during image processing. As shown in Table 1 and FIG. 4, Level 1 also provides protection against blank originals attacks. Level 1 also protects against a compromised tracing attack, where the adversary intercepts or tampers with the source of the tracing information. The trusted printer 132 or 133 may be an standard color printer provided that may use special toner or ink including, for example, fluorescing toner or ink.

Figure 5:
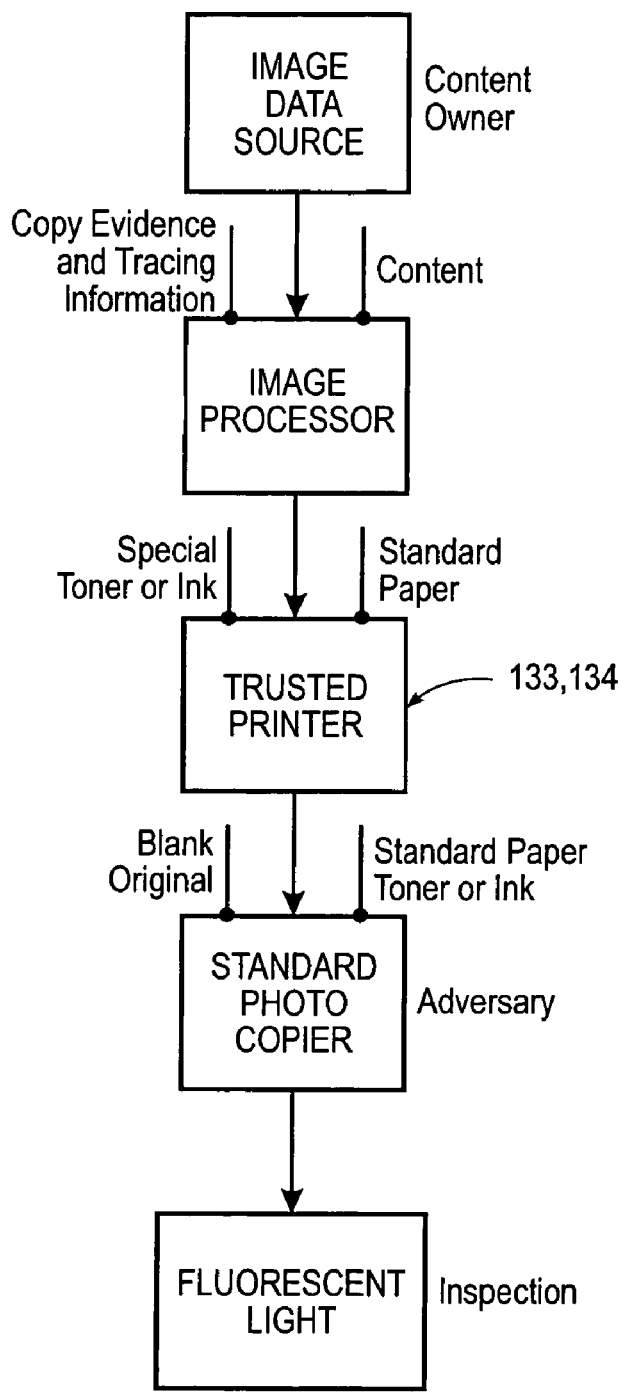
FIG. 5 is a flow diagram of a document forgery protection printing and detection system according to an exemplary embodiment of this invention.

As shown in FIG. 1, the trusted printer 133 can print documents having Level 2 protection. As shown in Table 1, Level 2 protection includes a fragile variable fluorescing invisible copy evident watermark with tracing information. The copy evidence may include the text of the page offset by some distance, but in any event depends on the contents of the page. The copy evidence and the tracing information may be encoded in the fragile variable fluorescing invisible copy evident watermark. As shown in FIG. 5, the document, including the contents, the copy evidence and tracing information, is printed by the trusted printer 133 on standard paper using a special toner or ink. The special toner or ink is invisible fluorescing toner or ink. As shown in Table 1, the trusted printer 133 can be a standard highlight or color printer that is supplied with the fluorescing invisible toner or ink. A sensor on the output of the printer could verify that the copy-evident mark is properly printed.

The variable nature of the copy-evident mark prevents a blank originals attack where the adversary pre-processes the paper by putting the special marks on it. The identifying information also allows for tracing the source of the unauthorized copy action. That is, the underlying information identifies who had custody over the original and should have been protecting it. The Level 2 protection might also be used to give some protection against an adversary who tries to tamper with the contents of the document, because the two printings on the page would be visually different under fluorescent light.

As shown in Table 1 and in FIG. 5, Level 2 provides protection against an adversary who has access to the original document and a standard photocopier with standard toner or ink. A document can be verified as an original by illuminating that document with fluorescence-exciting light. If the document contains a watermark that fluoresces under the fluorescence-exciting light and that matches the visible contents of the page, the document can be verified as an original. If the document does not have a watermark, if the document contains a watermark that does not fluoresce under fluorescence-exciting light, or if the document contains a watermark that fluoresces but does not match the visible contents of the page, the document can be established as a copy.

As shown in FIG. 1, the trusted printer 133 can print documents having Level 3 protection. As shown in Table 1, Level 3 protection includes a fragile variable fluorescing invisible copy evident watermark with tracing information. The mark includes a copy or a portion of the text of the page offset to the right by some distance and printed using invisible fluorescing toner. Tracing information such as printer, user, timestamp, document-id, and page number is also printed using the invisible ink. The information contained in the copy evident mark is digitally signed and encoded into a glyph code that is printed in the left margin of the page.

Figure 6:
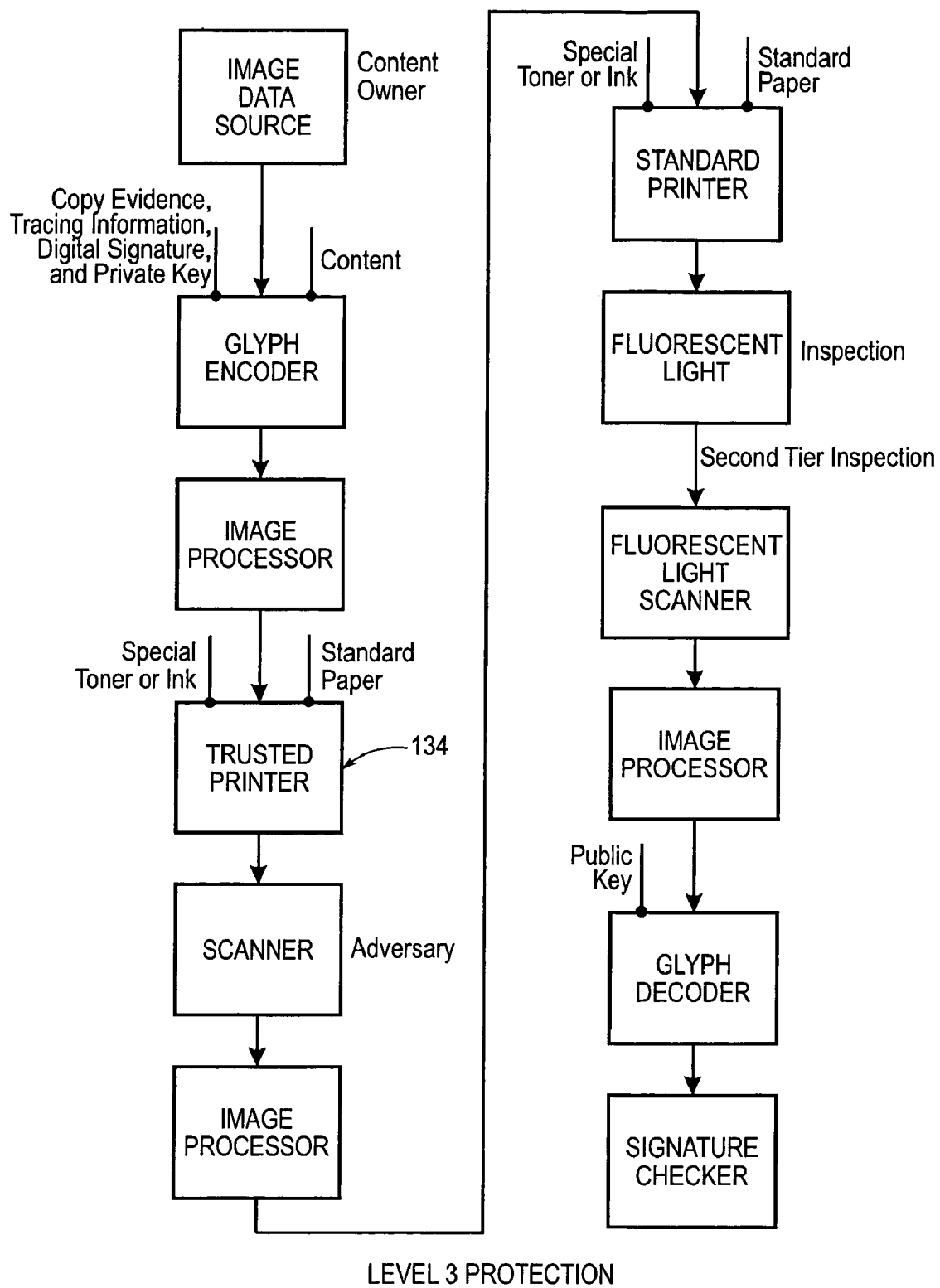
FIG. 6 is a flow diagram of a document forgery protection printing and detection system according to an exemplary embodiment of this invention.

As shown in Table 1 and FIG. 6, Level 3 provides protection against an adversary who can scan, image process, and print, and thus attempt to tamper with the content of the document, and who has access to the special ink used. Protection against a naive attacker is via a fluorescent detector as in Level 2 protection. Additional tamper protection and authenticity is provided by the digital signature encoded in the glyph code.

Special inks and an ordinary highlight printer or an ordinary color printer can be used to print the original documents. Enhancements to the printer can include sensors to check that fluorescent toner is loaded and used. Additionally, a sensor on the output of the printer can be used to verify that the copy evident mark is properly printed. A fluorescence-exciting light source can be used to expose the copy evident mark and a fluorescent light scanner can be used to read the information printed in fluorescent ink. This method is backward compatible with Level 2 protection.

As shown in FIG. 6, a document may be verified as an original by the presence of a fluorescent copy-evident mark that matches the visible content the page or by successful verification of the digital signature encoded in the glyph code. A document may be verified as a copy by the absence of the fluorescent copy evident mark. If the fluorescent copy evident mark exists, the document may still be verified as a copy if the digital signature cannot be successfully verified.

As shown in FIG. 1, the trusted printers 133 and 134 can print documents having Level 4 protection. As shown in Table 1, Level 4 protection includes a fragile invisible fluorescing variable copy evident watermark to print randomly generated patterns. Tracing information is also included in the copy evident watermark. The random pattern of the copy evident mark is digitally signed and encoded into a glyph code, that is printed on the page.

Figure 7:
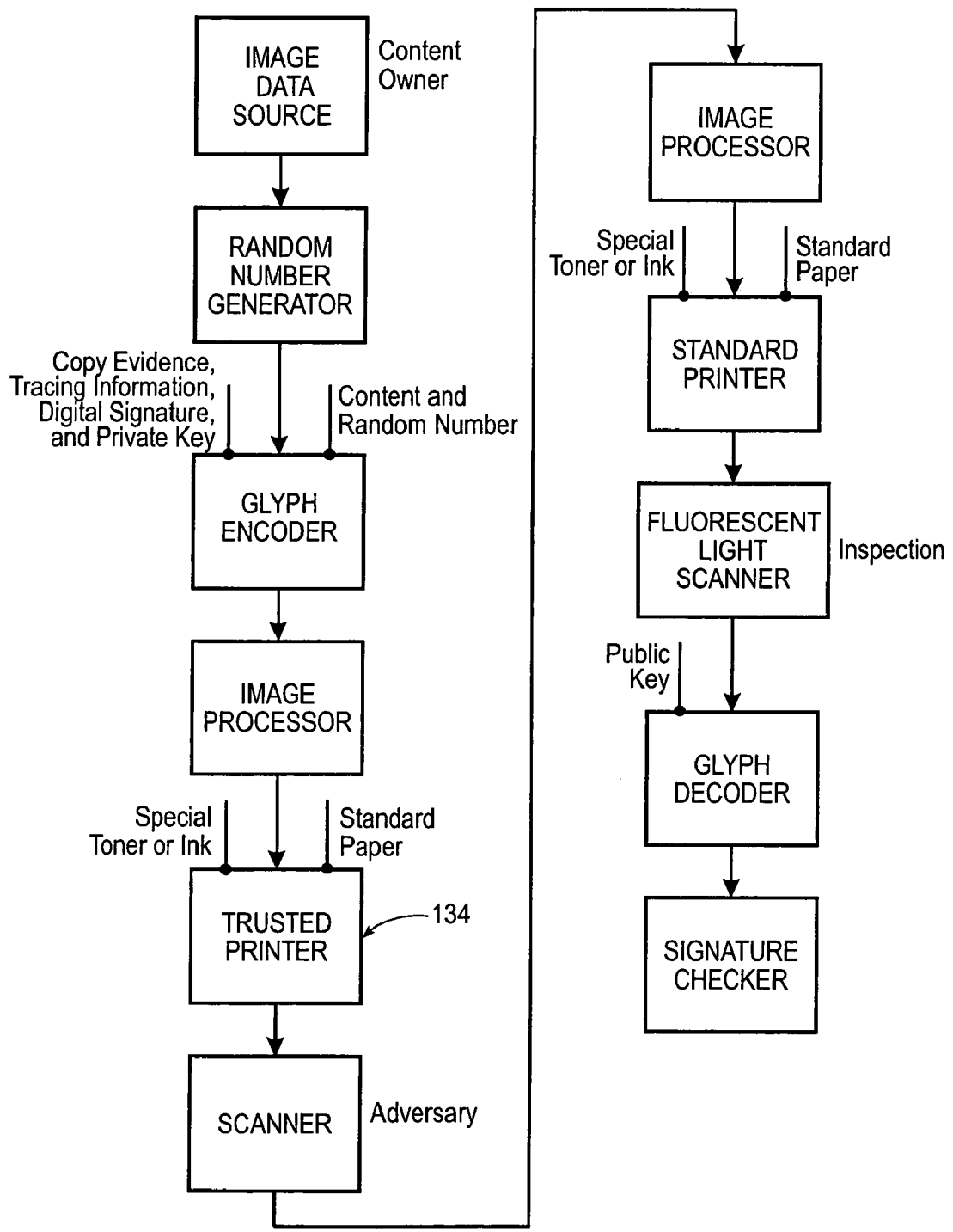
FIG. 7 is a flow diagram of a document forgery protection printing and detection system according to an exemplary embodiment of this invention.

As shown in FIG. 7, Level 4 provides protection against an adversary who has access to a scanner, image processing software, and a color printer, as well as access to the special ink used, and who may attempt to use these to tamper with the content of the document or to forge an acceptable copy evident mark. Additional tamper protection and authenticity is provided by the digital signature encoded in the glyph code.

Special inks and an ordinary highlight printer or ordinary color printer can be used to print the original documents. Enhancements to the printer could include sensors to check that fluorescent toner is loaded and used. Additionally, a sensor on the output of the printer can be used to verify that the pattern is properly printed. A fluorescence-exciting light source can be used to expose the copy evident mark. A fluorescent light scanner can be used to read the information printed in the fluorescent ink.

As shown in FIG. 7, a document may be verified as an original if the fluorescent pattern measured from the paper matches the pattern encoded in the glyph code or by successful verification of the digital signature. A document may be verified as a copy by the absence of the fluorescent copy evident watermark. If the copy evident mark is present, the document may still be verified as a copy if the fluorescent pattern measured from the paper fails to match the pattern encoded in the glyph code. A document may also be verified as a copy if the digital signature cannot be successfully verified.

Figure 8:
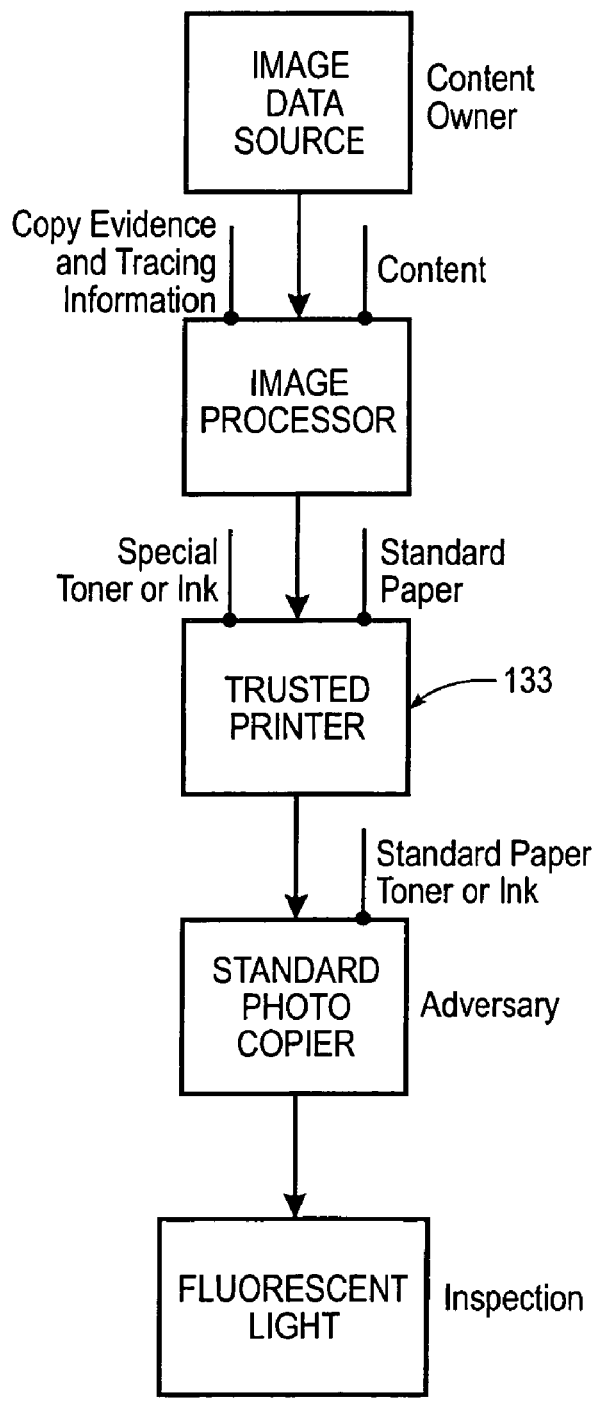
FIG. 8 is a flow diagram of a document forgery protection printing and detection system according to an exemplary embodiment of this invention.

As shown in FIG. 1, the trusted printer 134 can print documents having Level 5 protection. As shown in Table 1, copy evidence is provided by the use of a robust fluorescing black copy evident mark. Tracing information is encoded in the mark. As shown in FIG. 8, Level 5 provides protection against an adversary who uses a standard copier to make an unauthorized copy or attempted forgery, and who does not have access to the fluorescing ink. The equipment that can be used to enable Level 5 protection is fluorescing black toner in an ordinary highlight or color printer. A fluorescence-exciting light source can aid in the verification of the copy evident watermark.

A document may be verified as an original by visually inspecting the document. Visual inspection reveals the fluorescing black copy evident mark. A document may be verified as a copy by the absence of the copy evident mark, or a copy evident mark printed in ordinary ink.

Figure 9:
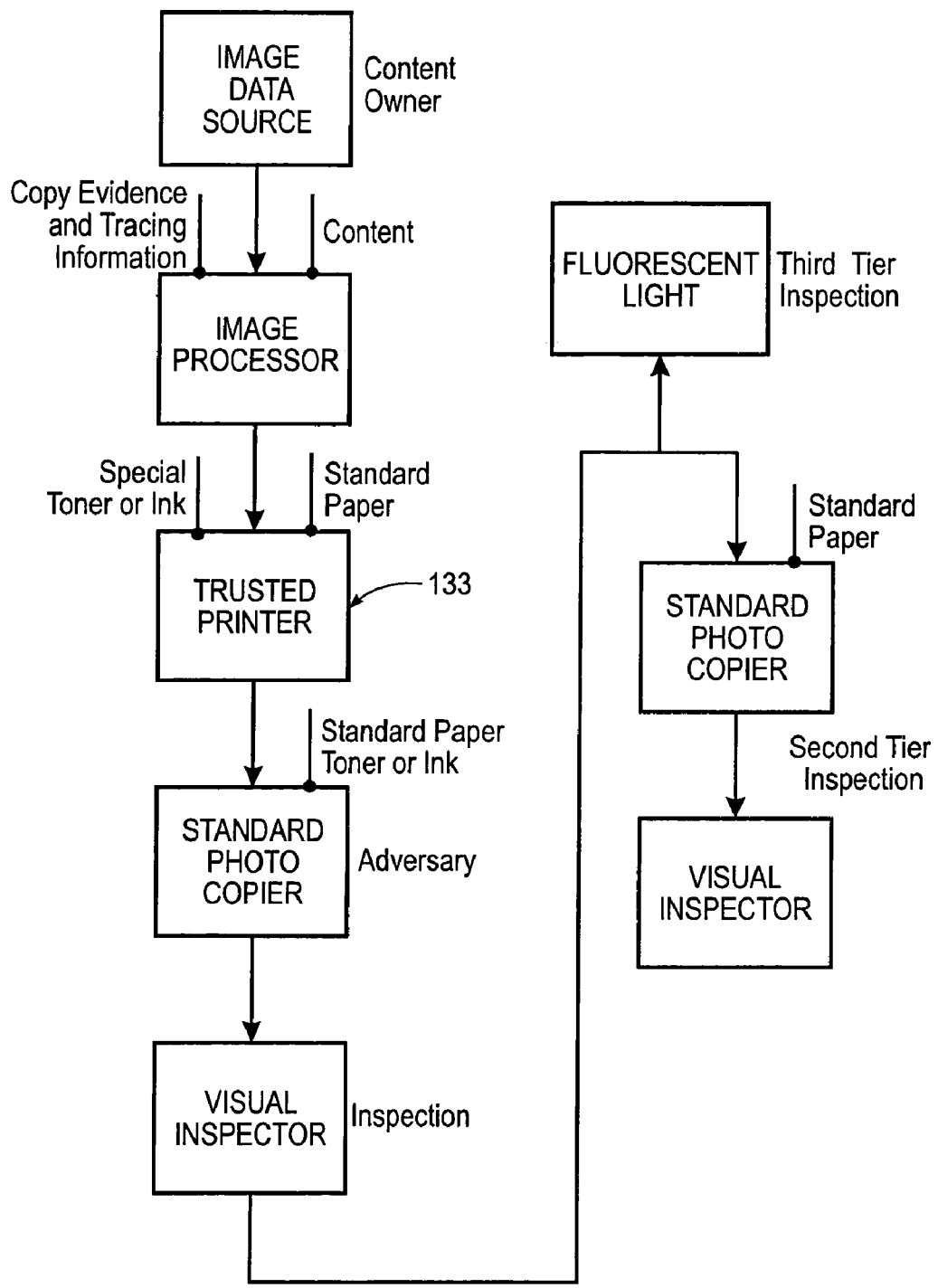
FIG. 9 is a flow diagram of a document forgery protection printing and detection system according to an exemplary embodiment of this invention.

As shown in FIG. 1, the trusted printer 134 can print documents having Level 6 protection. As shown in Table 1, copy evidence is provided by the use of a robust fluorescing black copy evident mark. For example, such a mark could be created by printing fluorescing invisible ink over ordinary black ink. The fluorescent black ink is used to print fixed portions of the document contents (the portion selected to be printed in this way does not depend on the document contents). Tracing information can also be encoded in the mark. As shown in FIG. 9, Level 6 provides protection against an adversary who uses a plain copier to make an unauthorized copy or attempted forgery and who does not have access to the special ink. Level 6 also protects against an adversary with physical access to the trusted printer that detaches the fluorescing toner, since this would cause portions of the printed page to disappear.

The equipment that can be used to provide Level 6 protection includes fluorescing black toner or ink in an ordinary highlight or color printer or a combination of fluorescing invisible ink and ordinary black ink. A special viewer can be used to detect and verify the correct pattern of the copy evident watermark.

As shown in FIG. 9, a document may be verified as an original by visually inspecting the document to verify that the entire contents of the document page have been printed. A special viewer may be used to verify that part of the visible contents of the document fluoresces or to verify the correct fluorescent pattern. A document may be verified as a copy by visually inspecting the document. If a portion of the page has not been printed, the document can be verified as a copy. If the entire page has been printed, the document may be verified as a copy by the absence of the fluorescing black copy evident mark, or by the existence of a non-fluorescing copy evident mark. A document may be verified as a copy if the special viewer reveals an incorrect fluorescing pattern in the copy evident mark.

Figure 10:
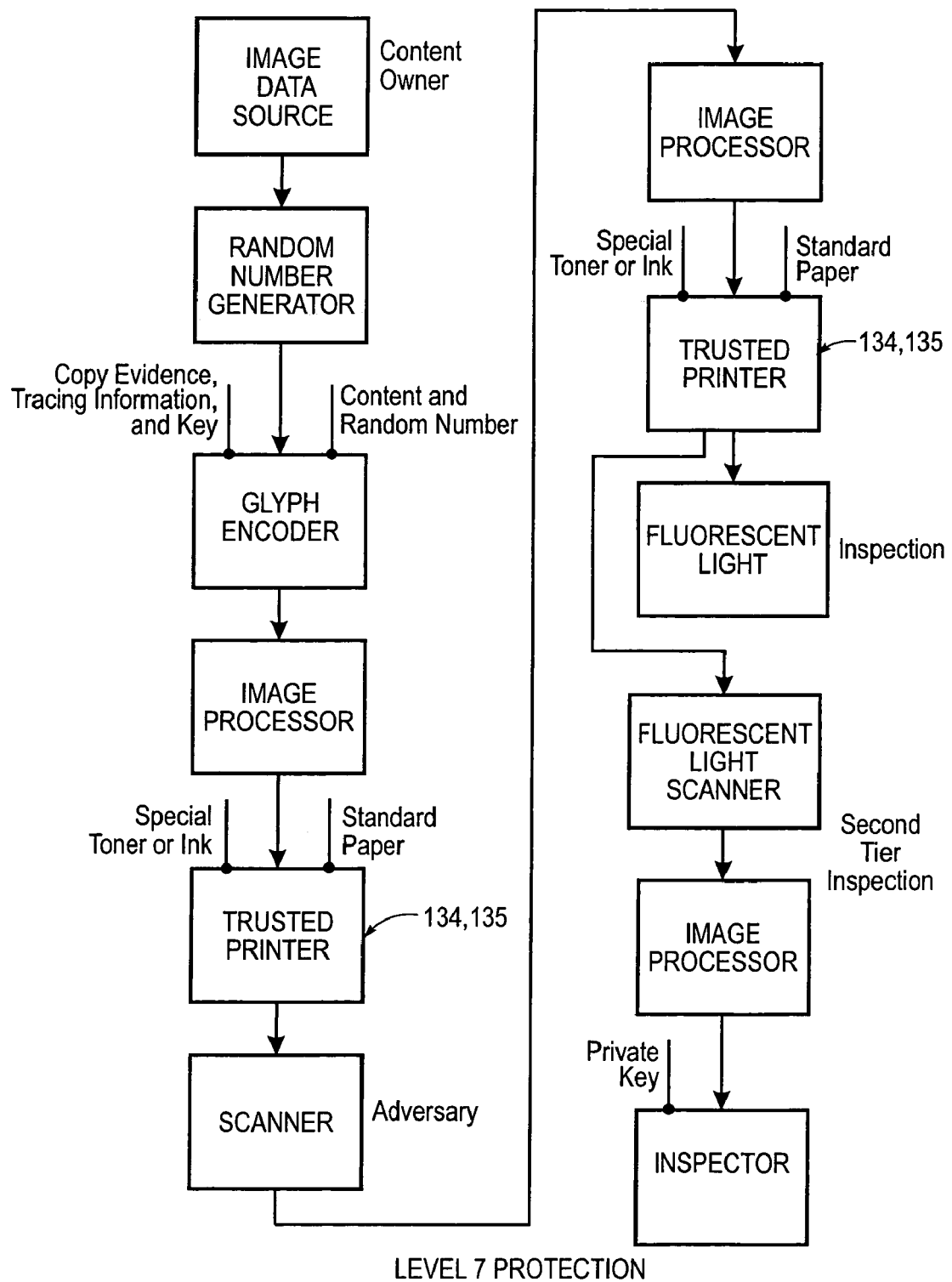
FIG. 10 is a flow diagram of a document forgery protection printing and detection system according to an exemplary embodiment of this invention.

As shown in FIG. 1, the trusted printers 134 and 135 can print documents having Level 7 protection. As shown in Table 1, Level 7 protection includes a robust fluorescent black variable copy evident watermark. As shown in FIG. 10, the fluorescent black toner or ink is used to print randomly selected portions of the content of the document. The information about which pattern is used is encrypted and encoded as a glyph code that is printed on the document using a key that is known to the trusted printers 134 and 135 and to an inspector device. The inspector device can read the glyph code, decode the glyph code to get the encrypted pattern information, and decrypt the pattern information. The copy evidence and the tracing information are also encoded in the watermark.

As shown in FIG. 10, Level 7 provides protection against an adversary that has access to an original document and the trusted printer 134 or 135 but does not have access to the fluorescent black toner or ink. Level 7 also protects against an attacker with physical access to the trusted printer that detaches the fluorescing toner, since this would cause portions of the printed page to disappear. Level 7 also protects against an attacker who has a scanner and an image processor.

Verification of a document as an original can be done using fluorescence-exciting light. If portions of the document fluoresces when exposed to fluorescence-exciting light, is evidence that the document may be an original. A second tier inspection is necessary. The inspector device verifies that the decrypted glyph-encoded information matches the fluorescent pattern. If portions of the document are missing, the document can be verified as a copy. If the entire document is printed but has no watermark or a black watermark that does not fluoresce, the document can be established as a copy. If the document has fluorescent portions but the decrypted glyph encoded information does not match the fluorescent pattern, the document can be established as a copy. If the decoded, decrypted pattern information matches the detected pattern, the document can be verified as an original.

The trusted printers 134 and 135 can be standard highlight or color printers provided with fluorescent black toner.

As shown in FIG. 1, the trusted printers 134 and 135 can print documents having Level 8 protection. As shown in Table 1, Level 8 protection includes a robust fluorescing black variable copy evident watermark to print content dependent portions of the document, with tracing information that is encrypted given a key known to the printer and to the inspector device and glyph encoded. The watermark includes selected portions of the document's contents that are printed in fluorescing black toner or ink. The selected portions are selected as a function of the document's content. Information about the user and about the trusted printer 135 and the fluorescing pattern are encrypted and encoded in a glyph code that is printed on the document.

Figure 11:
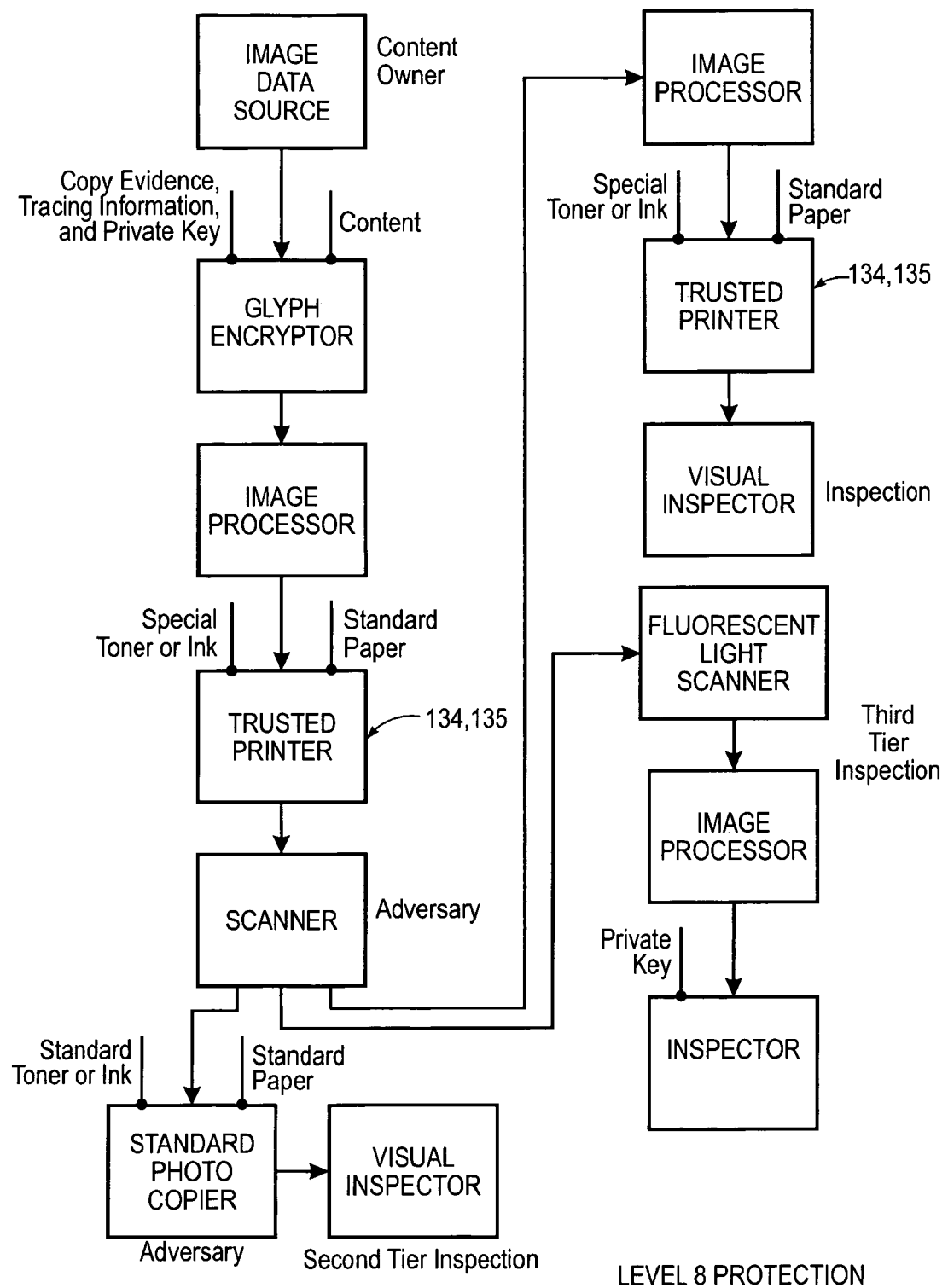
FIG. 11 is a flow diagram of a document forgery protection printing and detection system according to an exemplary embodiment of this invention.

As shown in Table 1, Level 8 provides protection against an adversary that has access to the original document and a standard copier and standard toner or ink. As shown in FIG. 11, Level 8 also protects against an adversary that has access to the original document, a scanner, an image processor and the trusted printer 134 or 135 and who tries to alter the tracing information. Even if the attacker tries to alter the tracing information, the attacker doesn't know the key to encrypt or decrypt the tracing information. Level 8 also protects against a detached toner attack, since this would cause portions of the printed page to disappear.

Establishing a document as a copy can also be done by a visual inspection. If portions of the printed document are missing, the document can be established as a copy. If the entire document is printed but has no visible watermark or a visible watermark that does not fluoresce, the document can be established as a copy. A second tier inspection determines if the pattern information that is decoded and decrypted from the glyph code by the inspector device matches the fluorescent pattern detected by a fluorescent light scanner. If the decoded, decrypted pattern information matches the detected pattern, the document can be verified as an original.

The trusted printers 134 and 135 can be standard highlight or color printers provided with fluorescent black toner. A fluorescent light scanner can be used to detect the fluorescent pattern and an inspector device can be used to read the glyph, decode the glyph to get the encrypted pattern information, decrypt the pattern information and match the pattern information against the detected fluorescent pattern.

While this invention has been described in conjunction with the various exemplary embodiments outlined above, it is evident that many alternatives, modifications and variations will be apparent to those skilled in the art. Accordingly, the various exemplary embodiments of the invention, as set forth above, are intended to be illustrative, not limiting. Various changes may be made without departing from the spirit and scope of the invention.

What is claimed is:

1. A document forgery protection printing method, comprising:
    processing an image of a document including at least one page;
    determining a forgery protection level to be applied to the document based on a policy that determines the forgery protection level for the document, the policy using a plurality of factors including at least contents related to the documents; and
    based on the determined protection level, printing at least one watermark including copy evidence and tracing information on each page of the document that corresponds to the determined protection level.

2. The method of claim 1, wherein the copy evidence is encoded in the watermark.

3. The method of claim 1, wherein the copy evidence varies with each page of the document.

4. The method of claim 3, wherein the watermark comprises the contents of each page printed using at least one of invisible fluorescing toner and invisible fluorescing ink and is offset from the visible contents of each page.

5. The method of claim 4, wherein the tracing information is digitally signed and encoded in a glyph and printed using at least one of invisible fluorescing toner and invisible fluorescing ink and located in a margin of each page.

6. The method of claim 1, wherein the watermark comprises random generated patterns printed using at least one of invisible fluorescing toner and invisible fluorescing ink.

7. The method of claim 6, wherein the randomly generated patterns are digitally signed and encoded in a glyph code.

8. The method of claim 1, wherein the watermark is printed using at least one of fluorescing black toner and fluorescing black ink and combinations of fluorescing invisible ink and toner and ordinary black ink and toner.

9. The method of claim 8, wherein the tracing information is encoded in the watermark.

10. The method of claim 1, wherein the watermark comprises of fixed portions of each page printed using at least one of fluorescing black toner and fluorescing black ink and combinations of fluorescing invisible ink and toner and ordinary black ink and toner.

11. The method of claim 1, wherein the watermark comprises random portions of each page printed using at least one of fluorescing black toner and fluorescing black ink.

12. The method of claim 11, wherein a random pattern used to determine the random portions of each page is encrypted and encoded in a glyph code.

13. The method of claim 1, wherein the watermark comprises content dependent portions of each page printed using at least one of fluorescing black toner and fluorescing black ink.

14. A document forgery protection printing system, comprising:
    at least one image processor that processes an image of document including at least one page;
    at least one server having a print management system and a policy that determines a forgery protection level for the document, the policy using a plurality of factors including at least contents related to the documents;
    a plurality of printers, each printer able to print the document and able to apply at least one protection level to the document by printing at least one watermark including copy evidence and tracing information on the document that corresponds to the determined protection level.

15. The document forgery protection printing system of claim 14, wherein the copy evidence is encoded in the watermark.

16. The method of claim 14, wherein the copy evidence varies with each page of the document.

17. The method of claim 16, wherein the watermark comprises the contents of each page printed using at least one of invisible fluorescing toner and invisible fluorescing ink and is offset from the visible contents of each page.

18. The method of claim 17, wherein the tracing information is digitally signed and encoded in a glyph and printed using at least one of invisible fluorescing toner and invisible fluorescing ink and is located in a margin of each page.

19. The method of claim 14, wherein the watermark comprises random generated patterns printed using at least one of invisible fluorescing toner and invisible fluorescing ink.

20. The method of claim 19, wherein the randomly generated patterns are digitally signed and encoded in a glyph code.

21. The method of claim 14, wherein the watermark is printed using at least one of fluorescing black toner and fluorescing black ink.

22. The method of claim 21, wherein the tracing information is encoded in the watermark.

23. The method of claim 14, wherein the watermark comprises of fixed portions of each page printed using at least one of fluorescing black toner and fluorescing black ink.

24. The method of claim 14, wherein the watermark comprises random portions of each page printed using at least one of fluorescing black toner and fluorescing black ink.

25. The method of claim 24, wherein a random pattern used to determine the random portions of each page is encrypted and encoded in a glyph code.

26. The method of claim 14, wherein the watermark comprises content dependent portions of each page printed using at least one of fluorescing black toner and fluorescing black ink.

* * * * *